(12) United States Patent
Lim

(10) Patent No.: US 12,495,201 B2
(45) Date of Patent: Dec. 9, 2025

(54) UNDERWATER VIDEO LIGHT SYSTEM

(71) Applicant: SUBNOX International Limited, Wanchai (HK)

(72) Inventor: Kay Burn Lim, Rivervale (AU)

( * ) Notice: Subject to any disclaimer, the term of this patent is extended or adjusted under 35 U.S.C. 154(b) by 60 days.

(21) Appl. No.: 18/647,490

(22) Filed: Apr. 26, 2024

(65) Prior Publication Data

US 2025/0338002 A1    Oct. 30, 2025

(51) Int. Cl.
| | |
|---|---|
| *H04N 23/56* | (2023.01) |
| *G03B 17/08* | (2021.01) |
| *H04N 23/661* | (2023.01) |
| *H04N 23/71* | (2023.01) |
| *H04N 23/72* | (2023.01) |
| *H04N 23/74* | (2023.01) |

(52) U.S. Cl.
CPC ............. *H04N 23/56* (2023.01); *G03B 17/08* (2013.01); *H04N 23/661* (2023.01); *H04N 23/71* (2023.01); *H04N 23/72* (2023.01); *H04N 23/74* (2023.01)

(58) Field of Classification Search
CPC ...... H04N 23/56; H04N 23/661; H04N 23/71; H04N 23/72; H04N 23/74; G03B 17/08
USPC .......................................................... 348/370
See application file for complete search history.

(56) References Cited

U.S. PATENT DOCUMENTS 9,188,292 B2 * 11/2015 Armer ................. F21V 23/0414
9,746,170 B1 * 8/2017 Armer ..................... F21V 29/58

* cited by examiner

*Primary Examiner* — Usman A Khan
(74) *Attorney, Agent, or Firm* — Edmond DeFrank

(57) ABSTRACT

The embodiments disclose an underwater video light system including a first LED light configured to project a natural daylight in a white color temperature in an underwater environment; a second LED light coupled to the first LED having a plurality of various colored LEDS configured to mix and blend primary colors and project color tinting of natural colors, a plurality of sensors coupled to the first and second LED lights configured to measure white balance including color temperatures of the underwater environment and depth, a power source coupled to the first and second LED lights, configured to adjust the light intensity based on sensors data, and an electronic ambient water color filter video light comprising the first and second LED lights configured for adjusting projected LED light levels to capture video images of underwater marine life and features in realistic natural colors at depths of water used with a camera.

20 Claims, 12 Drawing Sheets

UNDERWATER VIDEO LIGHT SYSTEM

BACKGROUND

A problem faced by underwater videographers is that water acts as a filter and the deeper the dive, the more colors are filtered out from the color spectrum starting from red colors and through to violet. At 5-6 m or so, the color red starts to fade out in the images. At 10 m oranges and yellows start to fade. This is why a lot of amateur underwater video clips look very bluish-green, depending on the location of the waters where the dive is taking place. Underwater cinematographers bring video lights underwater to not only illuminate the subjects but also to give color to subjects at depth. Video lights underwater can help by bringing that light source to depth. Almost all video lights are approximately 5600K in color temperature, mimicking daylight. However, there are limitations to what this can do.

The effect is only useful as far as the light can reach and the camera white balance should be set to film as on land to match the 5600K output by the video lights. Anything the light does not touch remains extremely blue when filmed in blue water and does not match what the light touches. Video lights have a very limited reach in water and light intensity drops exponentially the further the subject is from the lights as compared to the reach on land.

However, many cameras these days can white-balance the surrounding bluish or greenish-blue water and are somewhat effective without a torch. It is a function available even on compact cameras.

In addition to this, many cameras or underwater camera housings offer red filters to help bring reds and tints of yellow back into the image recorded for a more natural look. Magenta filters are also used in green water for a more natural look. Using these methods, however, poses a direct conflict with using video lights as everything the video lights illuminate will end up looking far too red, because of the red filter or because the camera's white balance injects red to compensate.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview

It should be noted that the descriptions that follow, for example, in terms of an underwater video light technology, are described for illustrative purposes and the underlying system can apply to any number and multiple types of underwater video cameras. In one embodiment of the present invention, the underwater video light technology can be configured using multiple color LED lights, combining these colors to produce a specific color temperature and tint to match the ambient water color temperature. The underwater video light technology can be configured to include manual controls and can be configured to include automatic sensor-based controls using the present invention.

Figure 1A:
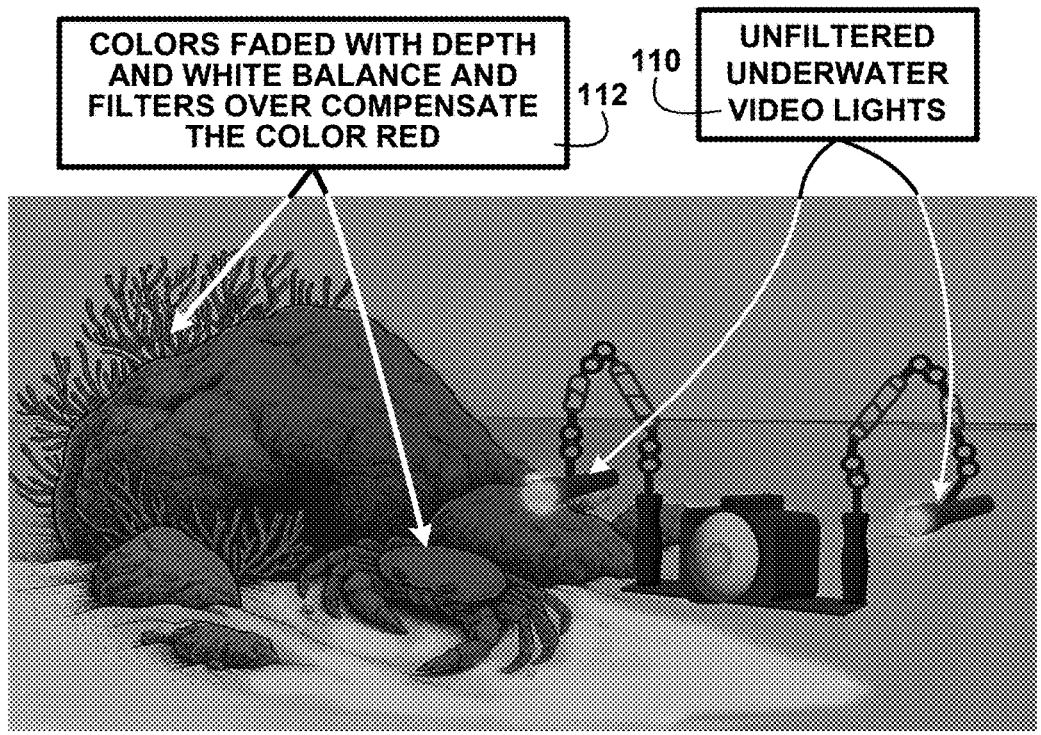
FIG. 1A shows for illustrative purposes only an example of underwater video lights of one embodiment.

FIG. 1A shows for illustrative purposes only an example of underwater video lights of one embodiment. FIG. 1A shows unfiltered underwater video lights 110. The unfiltered underwater video lights 110 are problematic when attempting to capture the real colors of underwater features and marine life when the camera has been accurately white balanced for the ambient water color temperature at said depth. The underwater colors faded with depth across the color spectrum starting with red, and the camera's manual white balance and/or red filters overcompensate the color red 112.

Figure 1B:
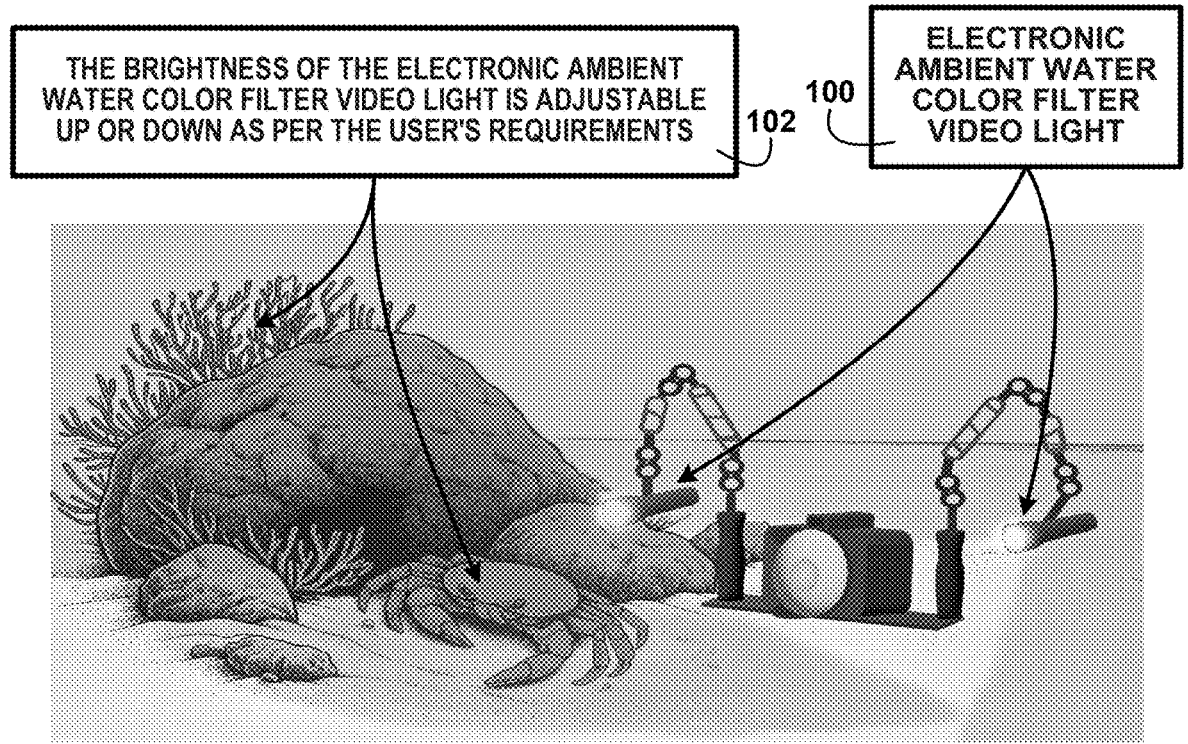
FIG. 1B shows for illustrative purposes only an example of electronic ambient water color filter video light of one embodiment.

FIG. 1B shows for illustrative purposes only an example of electronic ambient water color filter video light of one embodiment. FIG. 1B shows an electronic ambient water color filter video light 100. The "Electronic filter" uses mixed colored light sources to emit colored light to match surrounding water color accurately so that the light projected does not affect the camera's white balance or color filter performance. The brightness of the electronic ambient water color filter video light is adjustable up or down as per the user's requirements 102. This allows accurate photographic and video images to be captured in their real colors. The color of the natural light at the corresponding water depth is recreated to reveal more detail without affecting the manual white balance settings of the camera or the use of a red filter. This produces illumination without affecting color recorded at depth.

Detailed Description

Figure 2:
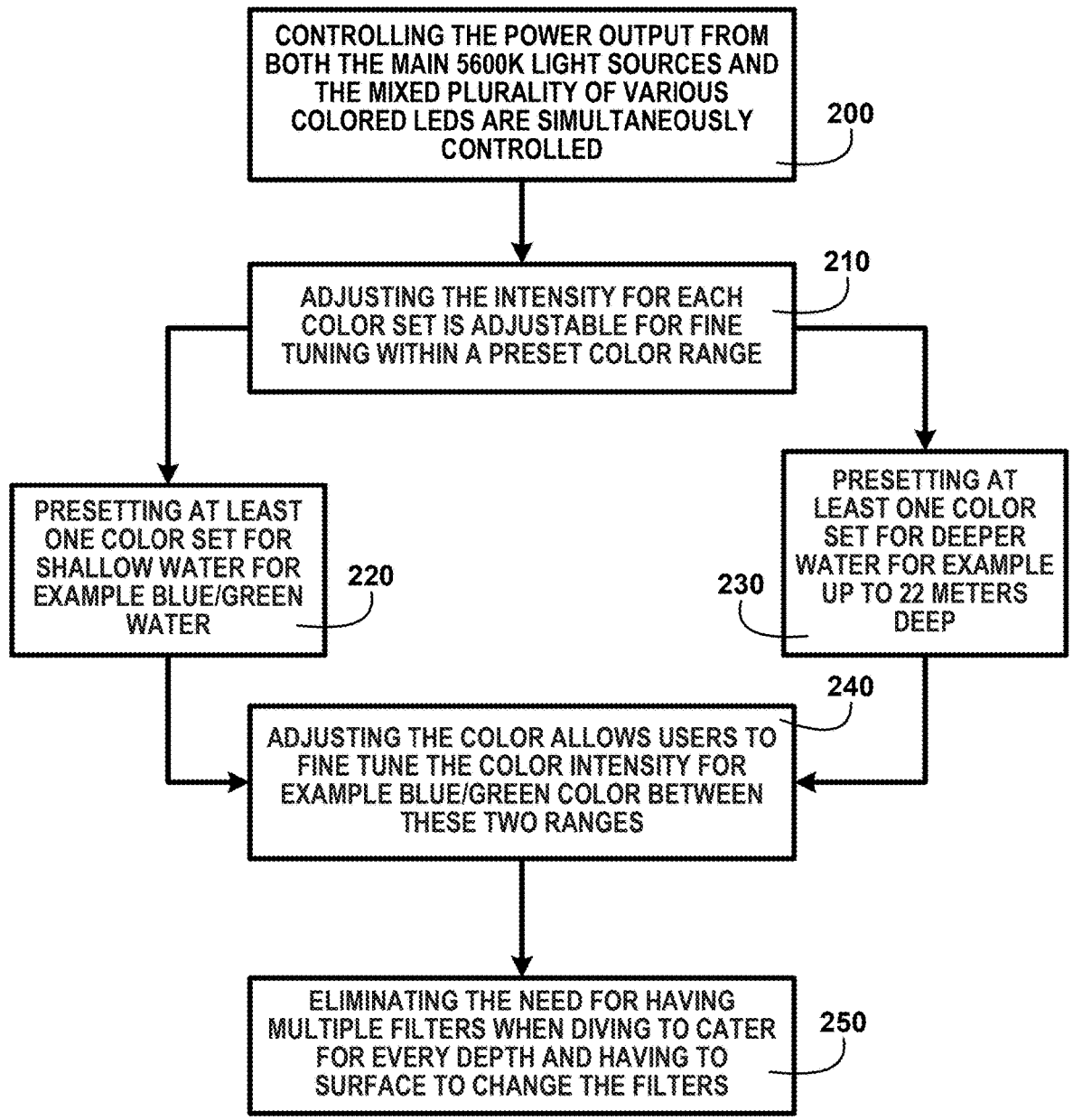
FIG. 2 shows a block diagram of an overview flow chart of operating electronic ambient water color filter video light of one embodiment.

FIG. 2 shows a block diagram of an overview flow chart of operating electronic ambient water color filter video light of one embodiment. FIG. 2 shows controlling the power output from both the main 5600K light source, and the mixed plurality of various colored LEDs are simultaneously controlled 200. Adjusting the intensity for each color set is adjustable for fine-tuning within a preset color range 210. Adjusting the intensity for each color set allows tints of the colors to match the changes caused by various water depths. Presetting at least one-color set for shallow water, for example, blue/green water 220 allows natural colors to be achieved in the brighter shallow water depth range of between 10 ft to 40 ft. The deeper the water, the more colors in the color spectrum are absorbed and become poorly visible.

Some colors seem to "disappear" at certain depths of the ocean, meaning the objects of a certain color will stop absorbing light and appear gray or even black. The water absorbs light produced by the sun; this is called white light, which is a combination of every color (we will get into that later). The color of visible light depends on its wavelength. Presetting at least one-color set for deeper water, for example, up to 22 meters deep 230. Adjusting the color allows users to fine-tune the color intensity, for example, blue/green color between these two ranges 240. This eliminates the need for having multiple filters when diving to cater to every depth or having to surface to change the filters 250.

The power output from both the main 5600k Light source and the mixed light are simultaneously controlled. The brightness of the video lights can be adjusted with just one power knob and the color will remain the same, just less or more brightness for each color temperature setting.

The intensity for each color set would also be manually adjustable via a knob for fine-tuning within a preset range. The color sets include a preset for shallow water, for example, blue-green water, and have another maximum preset for deeper water (up to 22 m). The knob allows users to fine-tune the color intensity, for example, blue-green color, between these two ranges of one embodiment.

Figure 3:
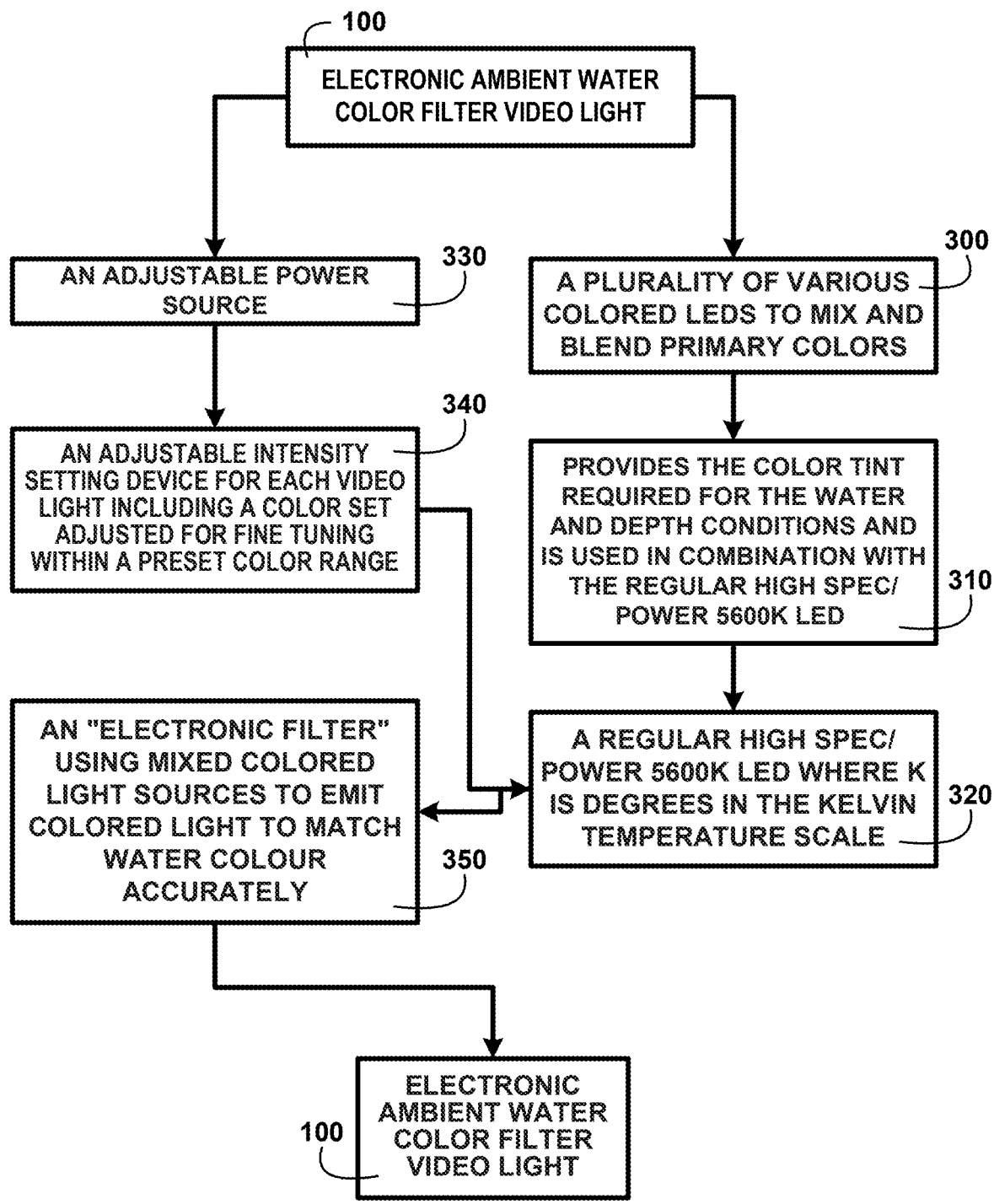
FIG. 3 shows a block diagram of an overview of the mix and blend of primary colors of one embodiment.

FIG. 3 shows a block diagram of an overview of a mix and blend of primary colors of one embodiment. FIG. 3 shows a plurality of various colored LEDs to mix and blend primary colors 300. The mix and blend process provides the color tint required for the water and depth conditions and is used in combination with the regular high spec/power 5600K LED 310. The regular high spec/power 5600K LED, where K is degrees in the Kelvin temperature scale 320, approximates a natural daylight color temperature.

The electronic ambient water color filter video light 100 includes an adjustable power source 330. The power source is a battery pack of rechargeable batteries. In one embodiment, the adjustable power source 330 includes a manually operated control allowing the user to adjust the various individual color LED mixed light intensity according to the water and depth conditions for an accurate and matching ambient water color temperature light. In another embodiment, the adjustable power source 330 includes electronic methods of determining in-water color temperatures at the underwater location including an automatic light sensor, an automatic white balance sensor, and an automatic power intensity actuator to automatically adjust the adjustable power source 330 to match the water color temperatures accurately and precisely.

In one embodiment, an adjustable intensity setting device for each video light includes a color set adjusted for fine-tuning within a preset color range 340. In another embodiment, the "electronic filter" uses mixed colored light sources to emit colored light to match water color accurately 350.

In one embodiment, the color sets will include at least 4 fixed colors including 5600K daylight, blue filtered, blue/green filtered, and green filtered. These fixed color sets have specific shades/hues of each color set. The user switching through each color set would be a manual process of pushing a button to cycle through the options.

In another embodiment, color sets will include automatic electronic methods of determining in-water color temperatures at the underwater location via white balance sensors and have the video lights automatically match these water color temperatures accurately and precisely.

The electronic ambient water color filter video light 100 uses various colored LEDs to mix and blend primary colors. The colored LED lights provide the tint required and are used in combination with the regular high spec/power 5600K LED. The red light is also sometimes used to get close to underwater creatures at night as most do not notice (or are not bothered) by red light.

Figure 4:
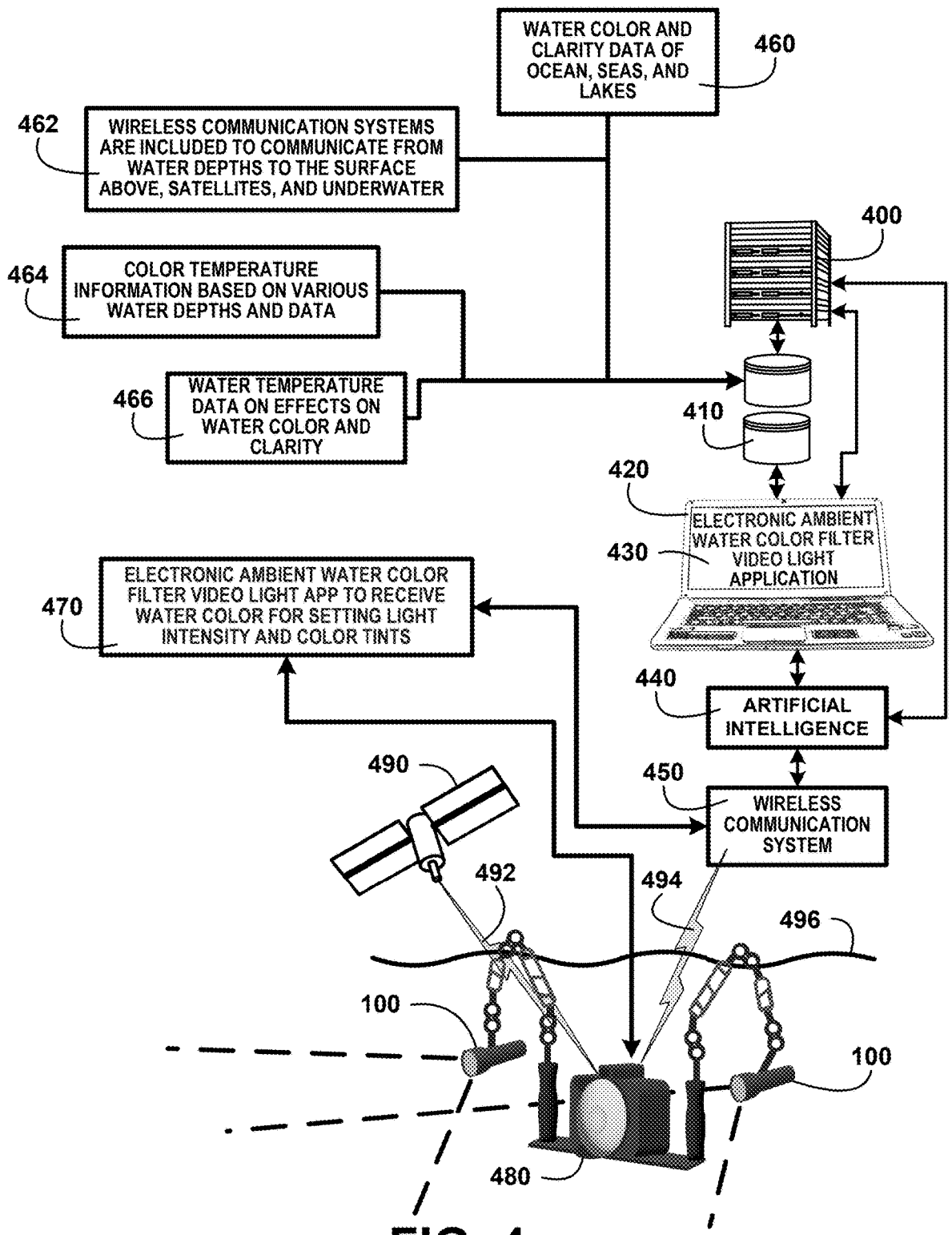
FIG. 4 shows for illustrative purposes only an example of wireless adjustment factors data of one embodiment.

FIG. 4 shows in one embodiment a plurality of a server 400, databases 410, computer 420, electronic ambient water color filter video light application 430, artificial intelligence 440, and wireless communication system 450. Water color, corresponding water depth (via a built-in electronic depth/pressure gauge), and clarity data of ocean, seas, and lakes 460 is collected and stored in the databases 410. Wireless communication systems are included to communicate from water depths to the surface above, satellites, and underwater 462. Additional information is stored in the databases 410 including color temperature information based on various water depths and data 464 and water temperature data on effects on water color and clarity 466. An electronic ambient water color filter video light app to receive water color for setting light intensity and color tints 470 is installed on the computer 420 and is transmitted to the electronic ambient water color filter video light for lighting and color adjustments. An underwater camera 480 having the electronic ambient water color filter video light 100 can receive satellite 490 GPS location 492 coordinates for transmitting and receiving communication 494 to and from the water surface 496. Where the electronic ambient water color filter video light 100 can make adjustments in light intensity and color set tinting of one embodiment.

Figure 5:
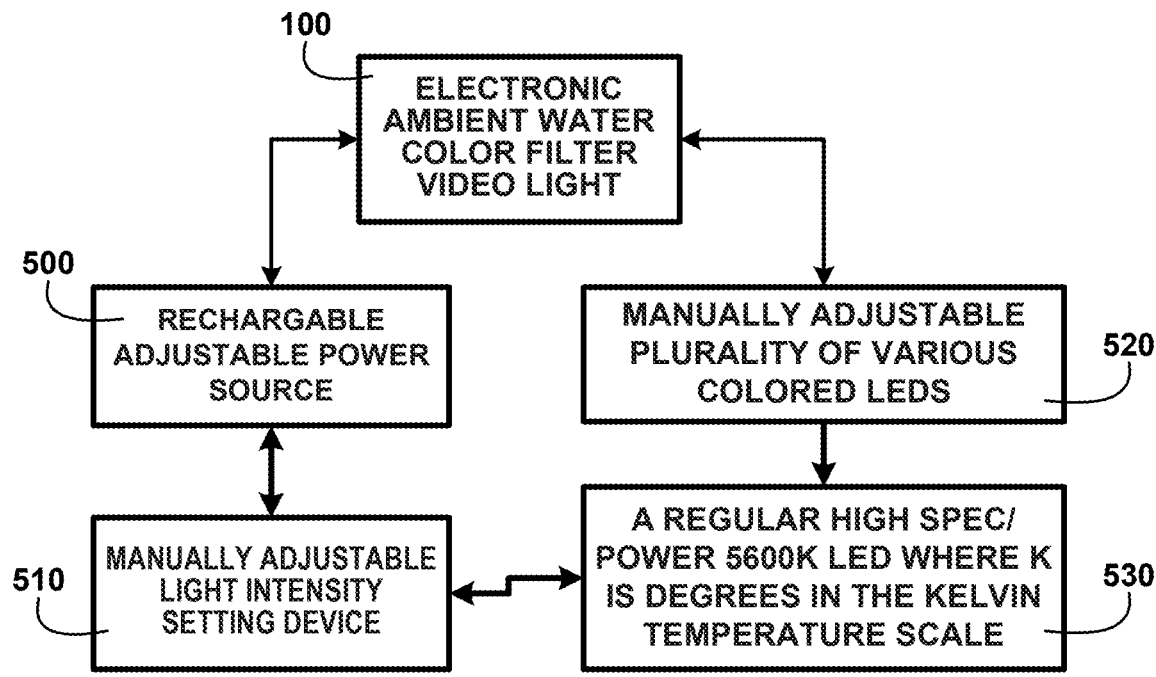
FIG. 5 shows a block diagram of an overview of the manually adjustable light intensity setting device of one embodiment.

FIG. 5 shows a block diagram of an overview of the manually adjustable light intensity setting device of one embodiment. FIG. 5 shows the electronic ambient water color filter video light 100 having a rechargeable adjustable power source 500, manually adjustable light intensity setting device 510, a manually adjustable plurality of various colored LEDs 520, and a regular high spec/power 5600K LED, where K is degrees in the Kelvin temperature scale 530.

Figure 6:
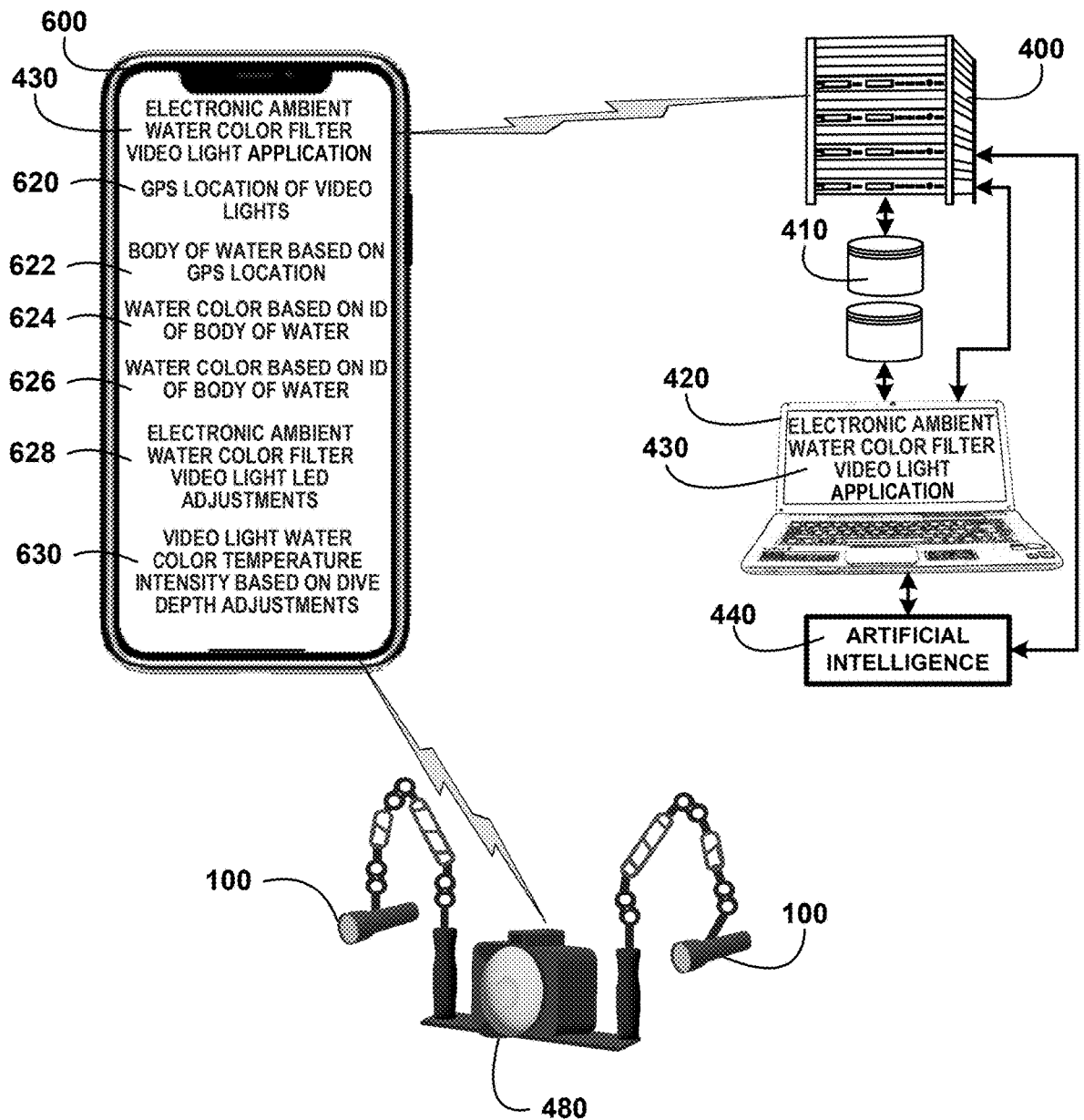
FIG. 6 shows for illustrative purposes only an example of an electronic ambient water color filter video light application of one embodiment.

FIG. 6 shows for illustrative purposes only an example of an electronic ambient water color filter video light application of one embodiment. FIG. 6 shows a plurality of servers 400, databases 410 a computer 420 having an electronic ambient water color filter video light application 430, and artificial intelligence 440. A user mobile device 600 has the electronic ambient water color filter video light application 430 installed. The user mobile device 600 is receiving data from the server 400 including a GPS location of video lights 620, a name of the body of water based on GPS location 622, a water color based on the ID of the body of water 624, a water color based on the ID of the body of water 626, electronic ambient water color filter video light LED adjustments 628, and video light water color temperature intensity based on dive depth adjustments 630. The underwater camera 480 adjustments are made using the electronic ambient water color filter video light 100 that includes a GPS location sensor 710 of FIG. 7 of one embodiment.

Figure 7:
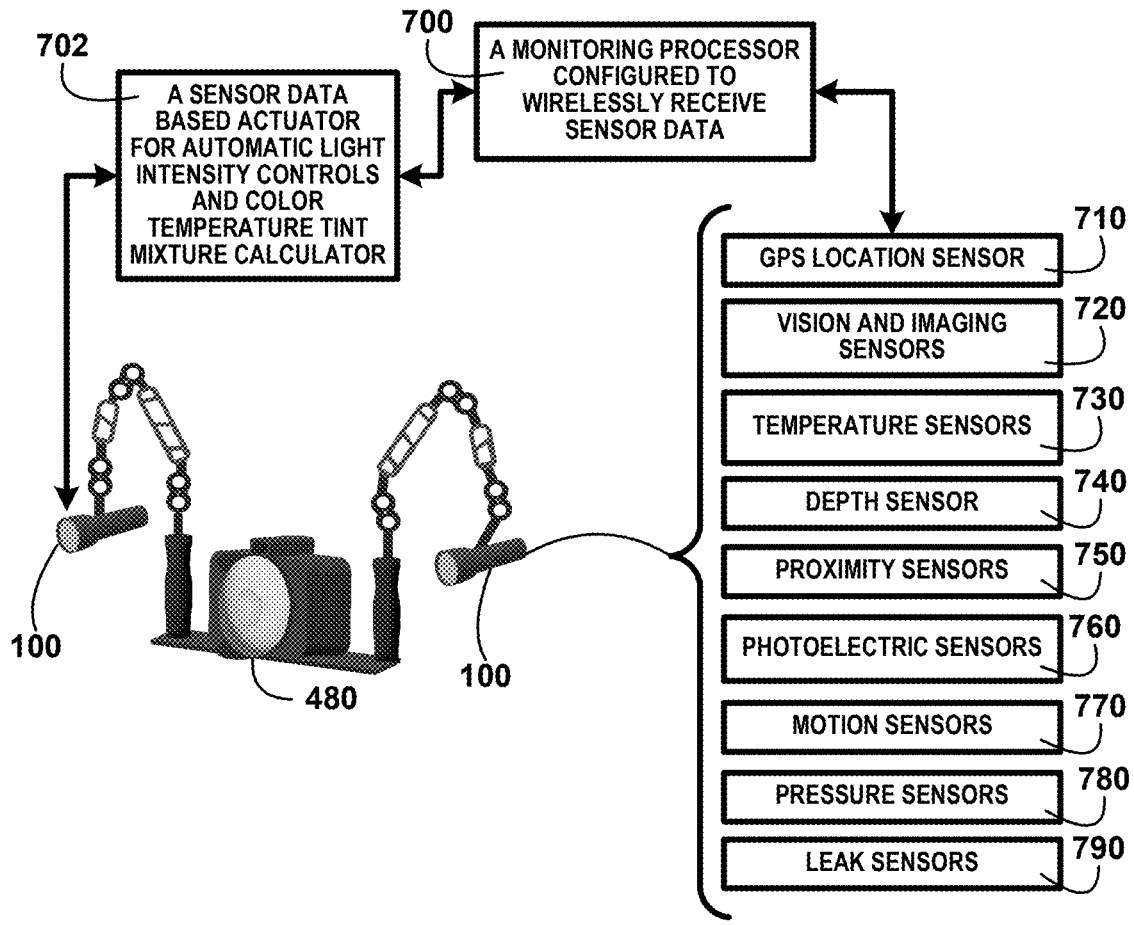
FIG. 7 shows a block diagram of an overview of monitoring data of one embodiment.

FIG. 7 shows a block diagram of an overview of monitoring data of one embodiment. FIG. 7 shows in one embodiment a monitoring processor configured to wirelessly receive sensor data 700. A sensor data-based actuator is used for automatic light intensity controls and color temperature tint mixture calculator 702 adjustments. An underwater camera 480 having the electronic ambient water color filter video light 100 attached in this embodiment includes a GPS location sensor 710. The GPS location sensor 710 receives satellite-transmitted GPS coordinates and the GPS location sensor 710 referring to the databases 410 of FIG. 4 recorded GPS coordinates of different bodies of water to pinpoint the location to further receive recorded water colors for that specific location with the body of water.

The embodiment further includes at least one of the following group of sensors including vision and imaging sensors 720, temperature sensors 730 to measure the ambient temperature of the water, as water temperature can affect color temperatures and absorption, a depth sensor 740, wherein most divers carry a depth gauge, this depth sensor 740 transmits the measured depth to the sensor data based actuator to apply temperature corrections to the recorded color temperatures, a proximity sensors 750 to measure a distance to a particular object of interest to more precisely adjust light intensity to accurately capture images of the particular object of interest.

The photoelectric sensors 760 accurately measure ambient levels of light at the then current depth, the motion sensors 770 detect movements of marine life including potential predators, for example, sharks, moray eels, and others to alert the diver, pressure sensors 780 measure the pressure at the current depth, to alert the diver should the pressure be nearing pressure limits of the photographic equipment and other equipment, leak sensors 790 to alert the diver of any leaks occurring in the equipment, that may damage the equipment. The sensors can be used to facilitate successful photographic actions of the dive. Natural color capture of the marine life and underwater objects in part depends on adjusting to the depth and color of the water of the dive.

Most segments of the ocean exhibit a predominantly blue hue, although variations occur, ranging from blue-green to green or even yellow to brown in certain regions. The electronic ambient water color filter video light 100 includes a plurality of various colored LEDs to mix and blend primary colors 300 of FIG. 3. The mix and blend process provides the color tint required for the water and depth conditions and is used in combination with the regular high spec/power 5600K LED 310 of FIG. 3 to capture natural colors in ocean water colors of all types. The blue coloration of the ocean stems from several contributing factors. Firstly, water selectively absorbs red light, allowing blue light to prevail and be reflected back from the water surface. Given that red light is readily absorbed, its penetration into the ocean is limited, typically extending to depths of less than 50 meters (164 ft). In contrast, blue light can permeate much deeper, reaching depths of up to 200 meters (656 ft).

Secondly, water molecules and minute particles within ocean water exhibit a preference for scattering blue light over light of other wavelengths. This phenomenon of blue light scattering is inherent even in exceptionally clear ocean water and mirrors the process of blue light scattering observed in the atmosphere. The electronic ambient water color filter video light 100 includes an adjustable intensity setting device for each video light including a color set adjusted for fine-tuning within a preset color range 340 of FIG. 3.

The primary constituents influencing the ocean's color include dissolved organic matter, living phytoplankton containing chlorophyll pigments, and non-living particles such as marine snow and mineral sediments. Satellite observations enable the measurement of chlorophyll levels, serving as a proxy for ocean productivity, specifically marine primary productivity in surface waters. In long-term composite satellite images, regions characterized by heightened ocean productivity manifest in yellow and green hues, indicative of elevated concentrations of green phytoplankton. Conversely, areas with lower productivity exhibit a predominance of blue tones. The electronic ambient water color filter video light 100 includes the "electronic filter" using mixed colored light sources to emit colored light to match water color accurately 350 of FIG. 3.

Understanding the interplay of these factors not only enhances the comprehension of the diverse colors observed in the ocean but also facilitates the use of remote sensing techniques to assess and monitor oceanic conditions and productivity levels. The electronic ambient water color filter video light 100 capabilities overcome water colors and depth distortions of color to create natural color photographic results when used in conjunction with cameras that have white balance adjustments or when red or magenta filters are employed.

Figure 8:
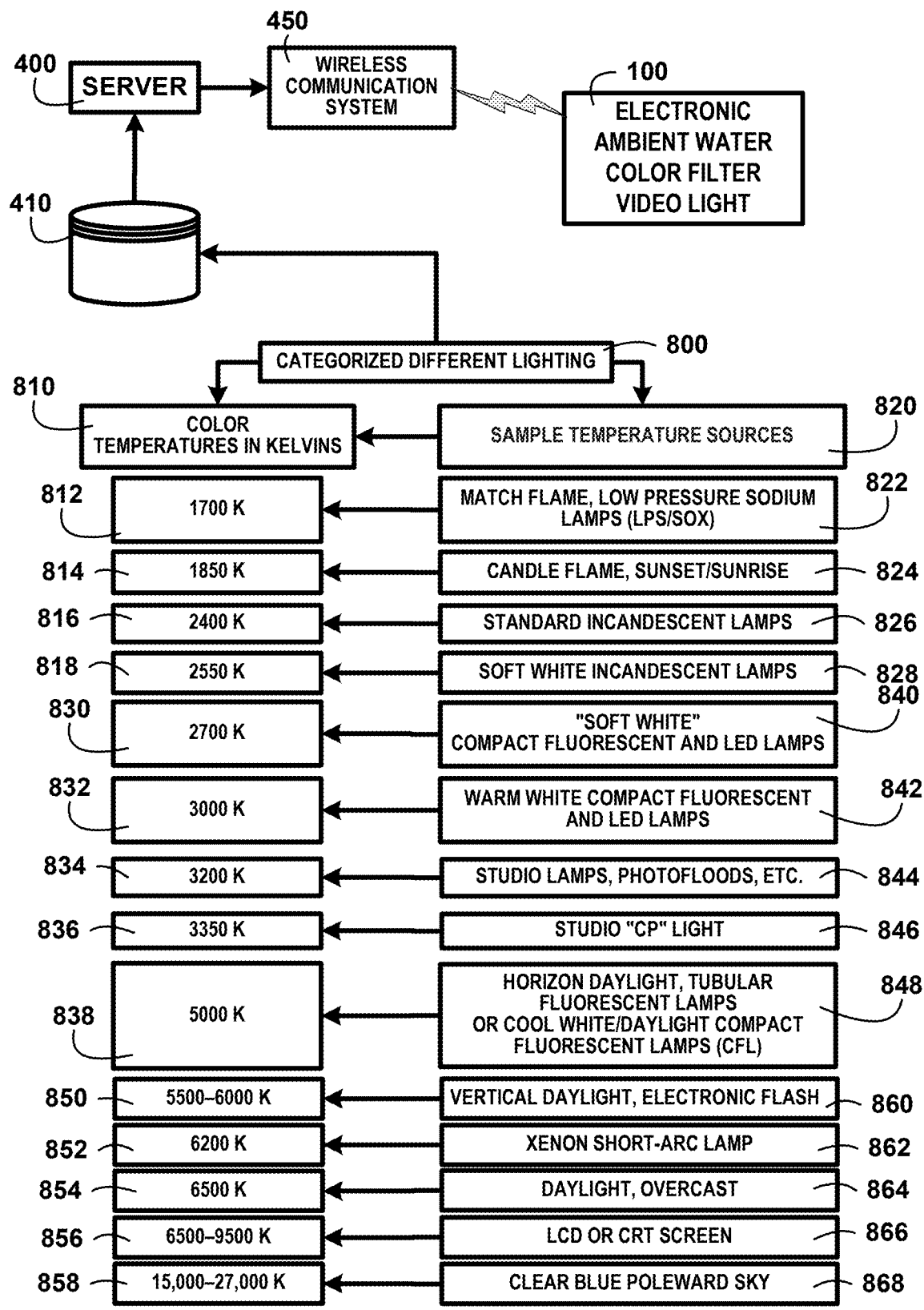
FIG. 8 shows for illustrative purposes only an example of categorized different lighting of one embodiment.

FIG. 8 shows for illustrative purposes only an example of categorized different lighting of one embodiment. FIG. 8 shows color temperatures in degrees Kelvin with examples of light sources for clarity of understanding the light levels at the various color temperatures. The categorized different lighting 800 shows color temperatures in Kelvins 810, based on degrees on the Kelvin temperature scale. Sample temperature sources 820 illustrate the lighting levels corresponding to the color temperature.

The levels are shown in color temperatures ranging from lower to higher, for example, at 1700 K 812 is approximately the level of a match flame, low-pressure sodium lamps (LPS/SOX) 822. The examples continue with 1850 K 814 for a candle flame, sunset/sunrise 824, 2400 K 816 for a standard incandescent lamps 826, 2550 K 818 for a soft white incandescent lamps 828, 2700 K 830 for a soft white compact fluorescent and LED lamps 840, and 3000 K 832 for a warm white compact fluorescent and LED lamps 842.

Additional color temperatures include 3200 K 834 for lamps for studios and similar environments, photofloods, etc. 844 and 3350 K 836 for a studio "CP" light 846. Examples in daylight include a color temperature of 5000 K 838 for horizon daylight, tubular fluorescent lamps, or cool daylight compact fluorescent lamps (CFL) 848 and 5500-6000 K 850 for vertical daylight, and electronic flash 860. A color temperature at 6200 K 852 is substantially equivalent to a xenon short-arc lamp 862. A color temperature of 6500 K 854 is substantially equivalent to daylight, overcast 864 with cloud cover. Daylight has a spectrum similar to that of a black body with a correlated color temperature of 6500 K. For colors based on black-body theory, blue occurs at higher temperatures, whereas red occurs at lower temperatures. This is the opposite of the cultural associations attributed to colors, in which "red" is "hot", and "blue" is "cold".

A color temperature of 6500-9500 K 856 is substantially equivalent to an LCD or CRT screen 866. The color temperatures ranging from 15,000-27,000 K 858 are present in a clear blue poleward sky 868. The color temperature data is recorded in databases 410 for use in determining adjustments in light intensity using adjustments in the power source of the electronic ambient water color filter video lights.

Databases 410 transmit the color temperature data to the server 400. The server 400 sends the color temperature data to the wireless communication system 450 for communication to the electronic ambient water color filter video light 100 to adjust the intensity of the light to overcome the specific body of water color temperature of the water.

Color temperature serves as a metric for characterizing the color of visible light and is defined by comparing the light's color to that emitted by an idealized opaque, non-reflective body. The temperature of the ideal emitter closely matching the original light source's color is termed the color temperature. This parameter is typically expressed in degrees on the Kelvin scale (K) and finds applications in diverse fields such as lighting, photography, videography, publishing, manufacturing, and astrophysics.

The color temperature scale describes the color of light emitted by a source, irrespective of its actual temperature. While color temperature has broad applications, its significance is most pronounced for light sources exhibiting a close correspondence to the color of a black body, ranging from red to orange, yellow, white, to bluish-white. Although the concept of correlated color temperature expands to any visible light, practical utility diminishes for colors like green or purple. Color temperature is conventionally expressed in kelvins (K), symbolized as K, representing an absolute temperature unit.

"Cool colors," characterized by color temperatures exceeding 5000 K, exhibit bluish tones, while "warm colors," with lower color temperatures (2700-3000 K), manifest yellowish hues. It is essential to note that "warm" and "cool" references pertain to traditional color categorizations rather than black body temperature. The hue-heat hypothesis suggests that lower color temperatures are perceived as warmer, while higher temperatures are perceived as cooler. This perception contrasts with the fact that warm-colored light sources often emit significant infrared radiation, leading to potential confusion.

The Sun, approximating a black-body radiator, has an effective temperature of 5772 K. The color temperature of sunlight above Earth's atmosphere is approximately 5900 K. The Sun's appearance, varying from red to white, depends on its position in the sky, with these changes attributed to sunlight scattering rather than alterations in black-body radiation. Rayleigh scattering by Earth's atmosphere causes the blue color of the sky, scattering blue light more than red. During the early morning and late afternoon, known as the golden hours, daylight exhibits a lower ("warmer") color temperature due to increased scattering of shorter-wavelength sunlight—an optical phenomenon known as the Tyndall effect. Daylight, conforming to a black body's spectrum, has a correlated color temperature of 6500 K (D65 viewing standard) or 5500 K (daylight-balanced photographic film standard).

Figure 9:
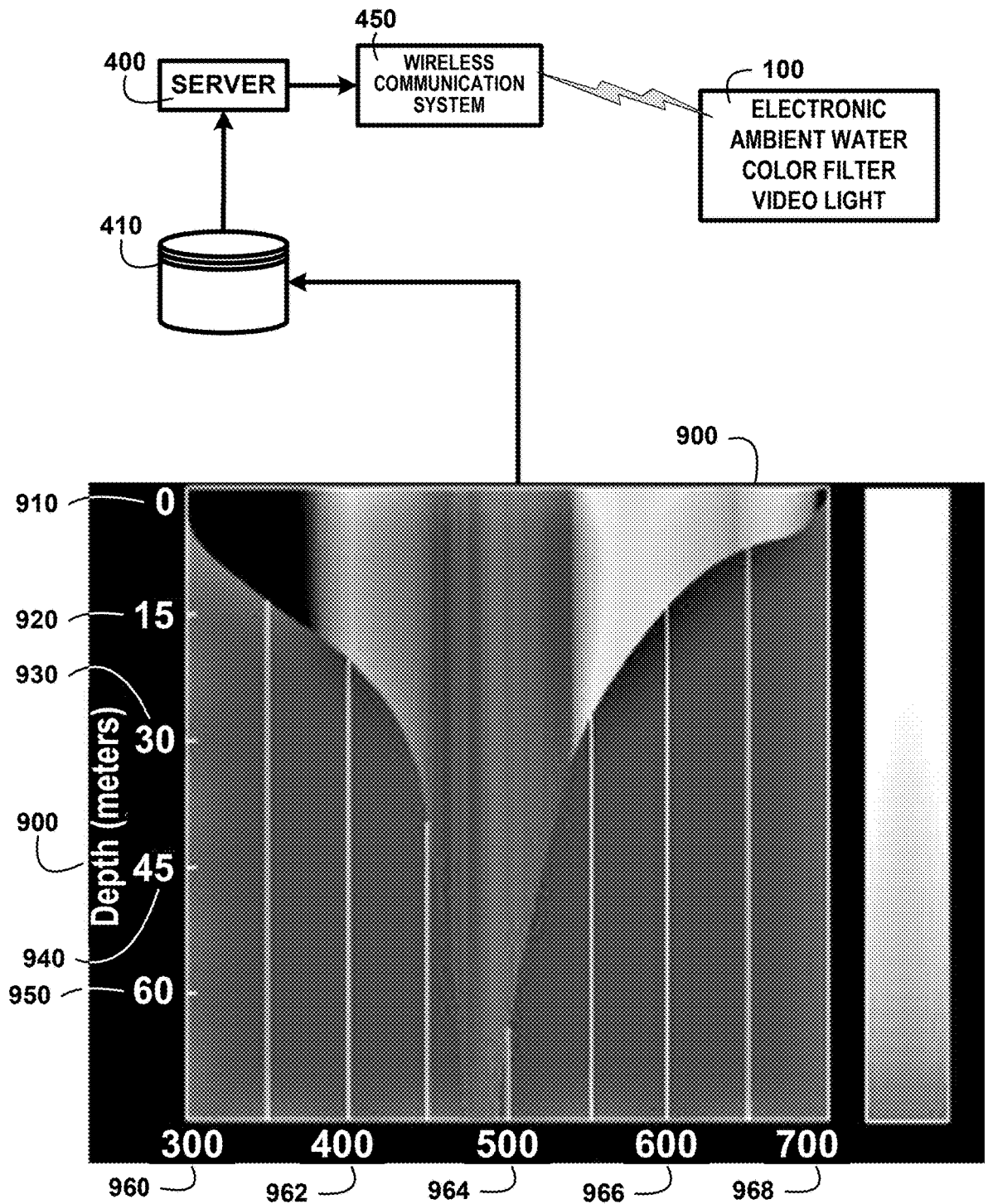
FIG. 9 shows for illustrative purposes only an example of light penetration in ocean water on a clear day of one embodiment.

FIG. 9 shows for illustrative purposes only an example of light penetration in ocean water on a clear day of one embodiment. FIG. 9 shows light penetration in ocean water on a clear day 900. The penetration is shown below the surface for daylight 910. The colors not shown are left to right violet, blue, light blue, green, yellow, orange, and red. The color wavelengths left to right range from 300 960, 400 962, 500 964, 600 966, to 700 968λ. The effect of the color absorption in the ocean water is shown in depth meters down to 70 meters. On the surface 0 meters 910, 15 meters 920, 30 meters 930, 45 meters 940, and 60 meters 950. The penetration data of degradation for the colors is recorded in the databases 410. The penetration data is used for determinations of adjusting the intensity for each color set.

The databases 410 transmit the ocean depth light penetration data to the server 400. The server 400 sends the specific ocean depth light penetration data to the wireless communication system 450 for communication to the electronic ambient water color filter video light 100 to adjust the intensity of the light to overcome the specific ocean depth light penetration.

As sunlight penetrates the ocean, longer wavelengths with higher energy levels are absorbed initially, transferring their energy to water particles. Due to its longer wavelength in the visible color spectrum, red is the first to be absorbed and disappears in water, causing red objects below approximately 20 feet to appear black.

The superior absorption of longer wavelengths like red and orange, the prevalent blue color in the ocean. This apparent contradiction is explained by the fact that the sun emits more blue wavelengths than violet, and human vision is more sensitive to blue than violet. The sun's color emissions show violet at the edge of the visible light spectrum. Additionally, the ocean's color perception is influenced by the fact that beyond the 700 nm range, invisible infrared wavelengths constitute over half of the sun's emissions.

Wavelengths, carrying energy, transfer heat when absorbed by objects. This thermal transfer explains why white objects remain cooler than black ones in the sun, as white reflects all wavelengths, while black absorbs them.

Considering the ocean's reflection characteristics, blue is the most prominent color, making it challenging to spot blue fish, which would appear to glow due to the reflected blue light. The coloration of marine organisms, often black or red in deep-sea environments, serves as an evolutionary advantage, preventing light reflection.

Figure 10:
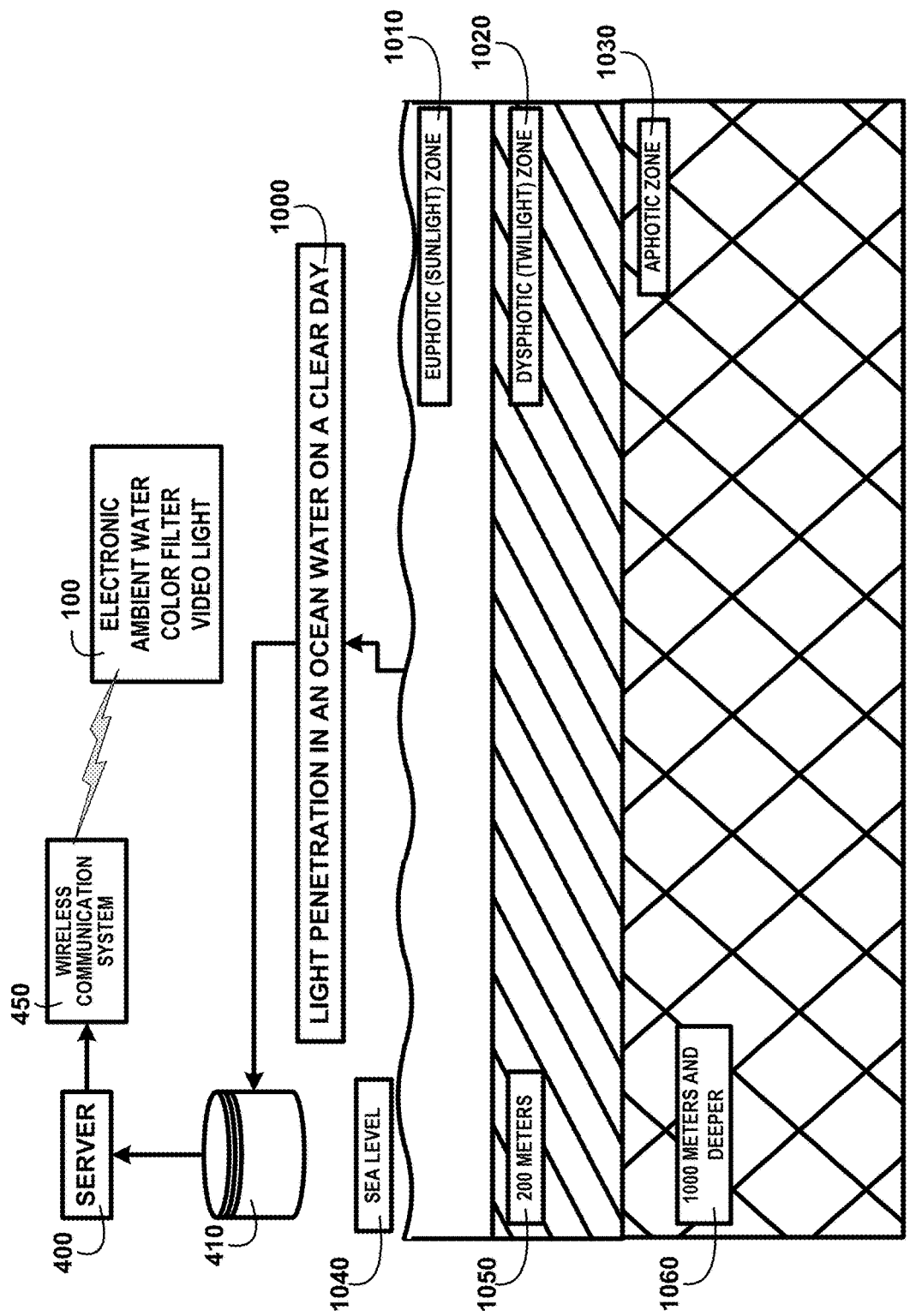
FIG. 10 shows for illustrative purposes only an example of light penetration in ocean water on a clear day of one embodiment.

FIG. 10 shows for illustrative purposes only an example of light penetration in ocean open water on a clear day of one embodiment. FIG. 10 shows light penetration in an ocean water on a clear day 1000. FIG. 10 shows a euphotic (sunlight) zone 1010 that receives daylight from the sea level 1040 (surface of the water) to a depth of 200 meters 1050. Below the euphotic (sunlight) zone 1010 is the dysphotic (twilight) zone 1020. The dysphotic (twilight) zone 1020 ranges from 200 meters 1050 to 1000 meters. An aphotic zone 1030 extends from 1000 meters and deeper 1060. The zones and depths data are stored on the databases 410 of one embodiment.

The databases 410 transmit the ocean color light penetration data to the server 400. The server 400 sends the specific ocean depth light penetration data to the wireless communication system 450 for communication to the electronic ambient water color filter video light 100 to adjust the intensity of the light to overcome the specific ocean color light penetration.

Figure 11A:
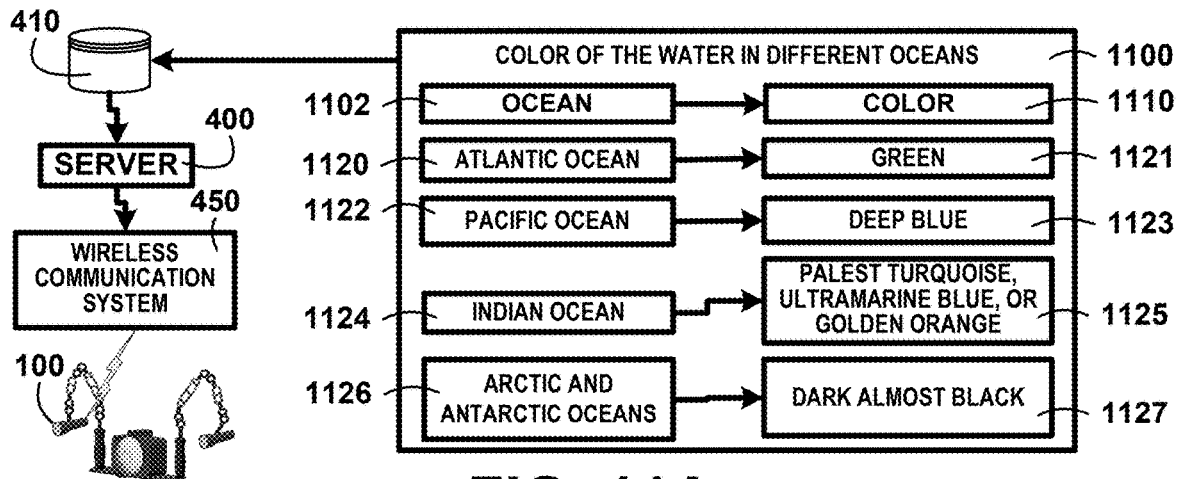
FIG. 11A shows a block diagram of an overview of the color of the water in different oceans of one embodiment.

FIG. 11A shows a block diagram of an overview of the color of the water in different oceans of one embodiment. FIG. 11A shows the color of the water in different oceans 1100. The information includes the name of the ocean 1102 and the typical color 1110 assessed to the ocean. It should be recognized that due to the extensive size of oceans, the color of micro areas within the ocean may vary. For example, the Atlantic Ocean 1120 in general is assessed with a green 1121 color, although the precise color at each location can vary. The Pacific Ocean 1122 usually has a deep blue 1123 color. The Indian Ocean 1124 is attributed with multiple colors including palest turquoise, ultramarine blue, or golden orange 1125. The extremely cold-water temperatures give the waters of the Arctic and Antarctic Oceans 1126 a dark almost black 1127 color. The color attributes of the oceans are recorded in the databases 410 of one embodiment.

The ocean's coloration extends beyond the typical blue spectrum, showcasing diverse hues influenced by various factors. Along the East Coast of the United States, the Atlantic Ocean often presents a greenish appearance, attributable to the abundance of algae and plant life. Photosynthetic organisms, containing chlorophyll, contribute to this green coloration while simultaneously absorbing red and blue light.

Moving to the Pacific Ocean, its waters are renowned for displaying a deep blue color. This characteristic is evident in wave views near locations like Encinitas, California. The Pacific Ocean stands out for harboring some of the world's deepest blue-colored waters, creating a distinctive visual identity.

Arctic and Antarctic waters, marked by extreme cold temperatures and the presence of sea ice, can exhibit dark and gloomy appearances. Despite these harsh conditions, these regions possess captivating beauty and biodiversity, featuring unique wildlife and stunning landscapes. The challenging environment, while often austere, contributes to the allure of these polar waters.

In contrast, the Indian Ocean stands out as the most diverse among Earth's oceans, exhibiting a spectrum of colors ranging from the palest turquoise to ultramarine blue and even golden orange hues. Recognized as the warmest ocean on the planet, the Indian Ocean covers one-fifth of Earth's surface, combining warmth with a vibrant palette, making it a region of exceptional ecological and aesthetic richness.

Figure 11B:
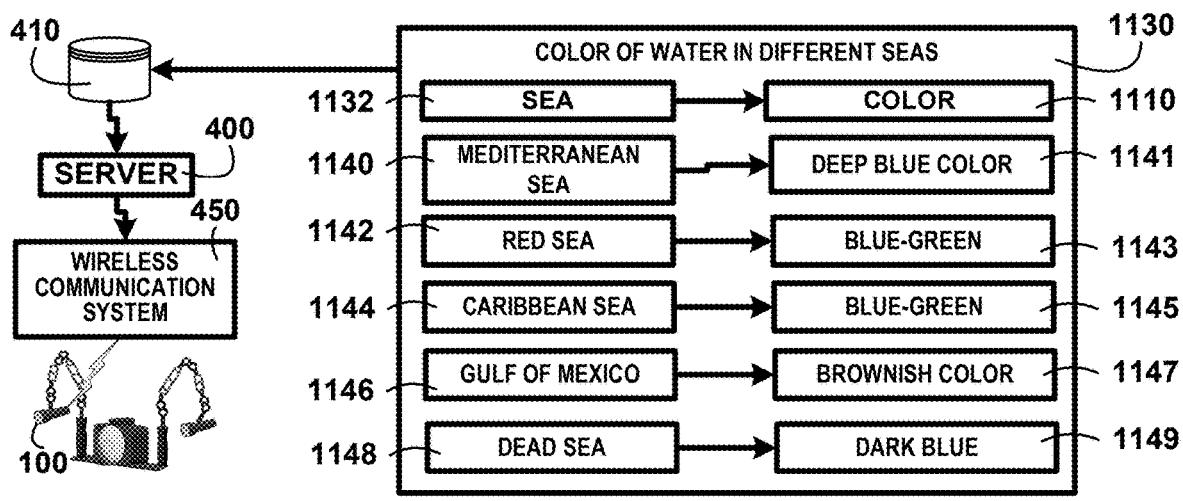
FIG. 11B shows a block diagram of an overview of the color of water in different seas of one embodiment.
Figure 11C:
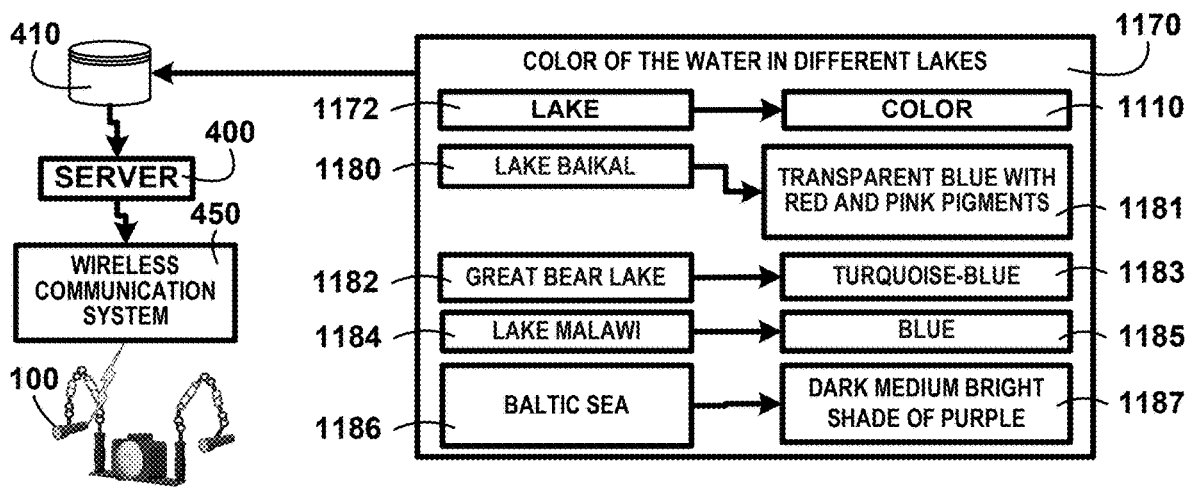
FIG. 11C shows a block diagram of an overview of the color of water in different seas of one embodiment.

The databases 410 of FIG. 11C can be used with the lighting equipment of the present invention in these ocean environments to transmit data to the server 400. The server 400 sends the specific ocean color of the water data to the wireless communication system 450 for communication to the electronic ambient water color filter video light 100 to adjust the intensity of the light to overcome the ocean color of the water.

FIG. 11B shows a block diagram of an overview of the color of water in different seas of one embodiment. FIG. 11B shows the color of water in different seas 1130. The information includes the name of the sea 1132 and its attributed color 1110 of the water. For example, the Mediterranean Sea 1140 has a deep blue color 1141, the Red Sea 1142 a blue-green 1143 color, the Caribbean Sea 1144 a blue-green 1145 color, the Gulf of Mexico 1146 has a brownish color 1147, and the Dead Sea 1148 has a dark blue 1149. The color of water in different seas data is recorded and stored in the databases 410 of one embodiment.

The databases 410 transmit the data to the server 400. The server 400 sends the specific sea color of the water data to the wireless communication system 450 for communication to the electronic ambient water color filter video light 100 to adjust the intensity of the light to overcome the sea color of the water.

FIG. 11C shows a block diagram of an overview of the color of water in different lakes of one embodiment. FIG. 11C shows the color of the water in different lakes 1170. Lakes can be different colors for a variety of reasons. The most common color is blue, but lakes can also be green, brown, or even pink. A few factors, including the presence of algae, minerals in the water, and the water's depth, determine the lake's color. FIG. 11C shows the name of a lake 1172 and its corresponding color 1110.

The present invention and the server 400 and database 410 of FIG. 11C is used to assist lighting adjustments in numerous real-world environments. For example, Cyanobacteria, a type of bacteria that contains a pigment called phycocyanin is one cause of the blue color of lakes. The Cyanobacteria contains a pigment that absorbs blue light and reflects back the blue color. This is one reason lakes appear blue when viewed from above. Lakes with many nutrients, such as phosphate and nitrogen, frequently have high concentrations of Cyanobacteria.

Also, vegetation surrounding a lake can cause a greenish color in the lake due to the presence of algae. The algae uses photosynthesis to convert sunlight into energy, producing oxygen and nutrients that feed other organisms causing the lake water to take on a greenish color. Lake water that becomes contaminated by organic matter releases tannins when decaying giving the lake water a brownish-yellowish tint. Other factors including depth, clarity, and surrounding landscape can affect the color of a brown lake. Algae, such as *Dunaliella salina*, can produce carotenoids that create a red or rose-colored hue to lake water. The pink lake color can be seen, for example, in Lake Retba in Senegal, Mono Lake in California due to increased levels of salt production, and Chilko Lake in British Columbia, Canada, where evaporation has resulted in a red hue.

Other causes of lake colors include rock and sediment particles. Minerals reflect light at different wavelengths, which leads to different colors. The color of a lake can range from shades of blue-green to brownish-red due to the type and amount of minerals in the water. Rocks can reflect colors ranging from white to a rusty red shade in the water. Sediment particles can also contribute to lake color variation.

A photochemical reaction caused by ultra-violet (UV) light between various molecules causes a chemical change resulting in the production of pink lakes. Some bacteria in these lakes use this chemical reaction to protect against sunlight by producing colorful pigments that absorb UV radiation and protect the bacteria cells from damage. Light scattering occurs when light waves encounter particles or molecules in the water. This changes color from blue to red due to water molecules' absorption of red light at a nuclear level. Minerals can cause lake color variation due to their chemical composition and interaction with sunlight.

Water temperature affects lake color. Temperature increases cause more particles to be dissolved into the water, which changes its color ranging from green to brownish red. Colder temperatures cause less particle dissolution, resulting in clearer, bluer waters. Conversely, warmer temperatures lead to increased dissolution of particles which can result in a variety of colors depending on the type of particles present in the water.

For example, lake Baikal 1180 has a color of transparent blue with red and pink pigments 1181, Great Bear Lake 1182 has a color of turquoise-blue 1183, Lake Malawi 1184 has a color of blue 1185, and the Baltic Sea 1186, which is classified as a lake, has a color of a dark medium bright shade of purple 1187. A listing of lakes and their colors is recorded in the databases 410.

The databases 410 transmit the data to the server 400. The server 400 sends the specific lake color of the water data to the wireless communication system 450 for communication to the electronic ambient water color filter video light 100 to adjust the intensity of the light to overcome the lake color of the water.

Figure 12:
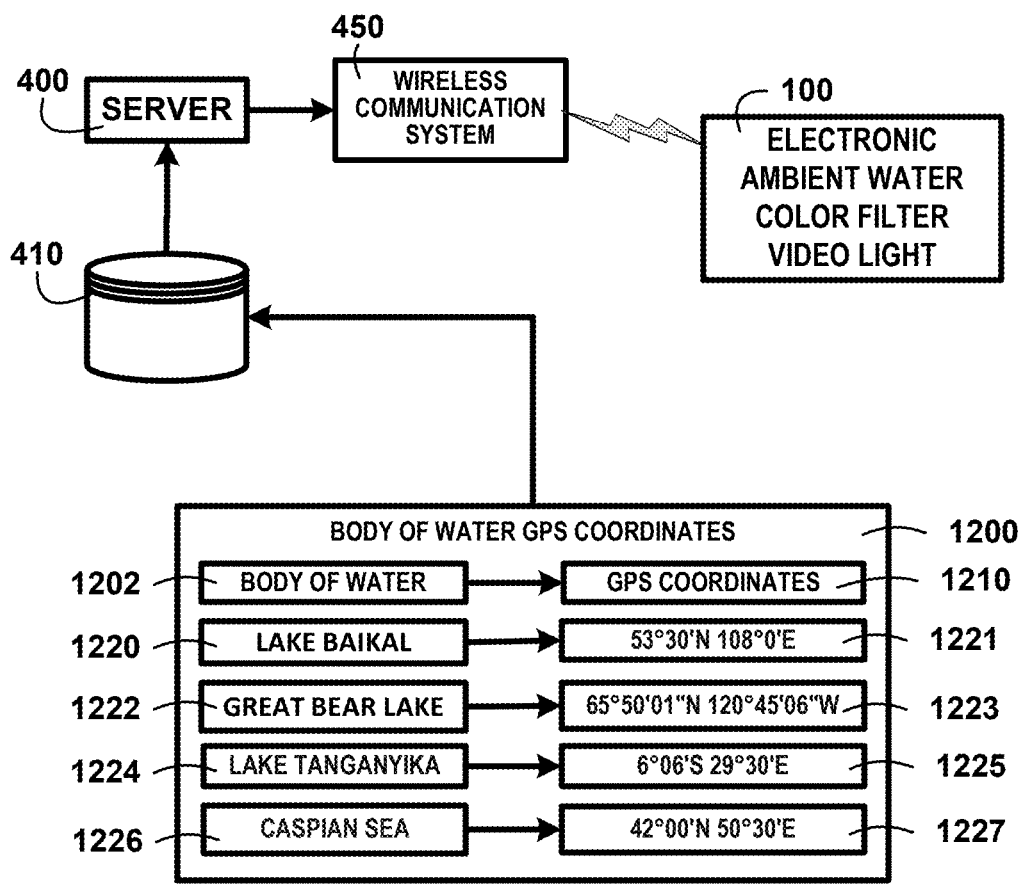
FIG. 12 shows a block diagram of an overview of the body of water with GPS coordinates of one embodiment.

FIG. 12 shows a block diagram of an overview of the body of water with GPS coordinates of one embodiment.

FIG. 12 shows the body of water with GPS coordinates 1200. The information includes the body of water 1202 and its GPS coordinates 1210. Oceans and seas are so large that a single GPS coordinate is not adequate to determine the location accurately. Examples of GPS coordinates 1210 include four lakes, Lake Baikal 1220 at 53° 30'n 108° 0'e 1221, Great Bear Lake 1222 at 65° 50'01"n 120° 45'06"w 1223, Lake Tanganyika 1224 at 6° 06's 29° 30'e 1225, and the Caspian Sea 1226 at 42° 00'n 50° 30'e 1227. The lake GPS coordinates 1200 are stored in the databases 410 for identifying the location of the diver using the electronic ambient water color filter video light 100.

The databases 410 transmit the body of water GPS coordinates 1200 data to the server 400. The server 400 sends the body of water GPS coordinates 1200 to the wireless communication system 450 for communication to the electronic ambient water color filter video light 100 to match the satellite received GPS location of video lights 620 of FIG. 6 to the body of water GPS coordinates 1200 data. The name of the body of water is confirmed. The name of the body of water triggers the server 400 to transmit data related to the water color and corresponding color temperature to the electronic ambient water color filter video light 100 to facilitate the adjustments of the light intensity and color LED tinting to result in precise lighting to result in natural light video captures of the underwater camera.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. An underwater video light system, comprising:
    a first LED light configured to project a natural daylight in a white color temperature in an underwater environment;
    a second LED light coupled to the first LED having a plurality of various colored LEDS configured to mix and blend primary colors and project color tinting of natural colors in an underwater environment;
    a plurality of sensors coupled to the first and second LED lights configured to measure white balance including color temperatures of the underwater environment and location depth;
    a power source coupled to the first and second LED lights, wherein the power source is configured to adjust the light intensity based on the plurality of sensors measurement data related to the underwater environment and location depth; and
    an electronic ambient water color filter video light coupled to the first and second LED lights configured for adjusting projected LED light levels to capture video images of underwater marine life and features in realistic natural colors at depths of water used with a camera.

2. The underwater video light system of claim 1, wherein the first LED light is rated in a range of 4000 Kelvin to 6000 Kelvin and the power source energizing the first LED light includes a battery pack having a plurality of rechargeable batteries.

3. The underwater video light system of claim 1, further comprising the first LED light includes at least one preset color set for shallow water.

4. The underwater video light system of claim 1, further comprising the first LED light includes at least one preset color set for deeper water.

5. The underwater video light system of claim 1, further comprising two light assemblies each having a first and a second LED light configured to mount on an underwater camera and projecting light simultaneously.

6. The underwater video light system of claim 1, further comprising a processor configured to analyze the underwater environment measured sensor data to recommend first and second LED light settings to produce illumination at levels desired by a videographer.

7. The underwater video light system of claim 1, further comprising a user adjustable light intensity setting device coupled to the electronic ambient water color filter video light configured for adjusting the light intensity using the power source.

8. An underwater video light system, comprising:
    a first LED light configured to project a natural daylight in a white color temperature in an underwater environment;
    a second LED light coupled to the first LED having a plurality of various colored LEDS configured to mix and blend primary colors and project color tinting of natural colors in an underwater environment;
    a plurality of sensors coupled to the first and second LED lights configured to measure white balance including color temperatures of the underwater environment and location depth;
    a power source coupled to the first and second LED lights, wherein the power source is configured to adjust the light intensity based on the plurality of sensors measurement data related to the underwater environment and location depth;
    an adjustment device coupled to the power source configured to allow a user to adjust the power to the first and second LED lights to adjust the light intensity illumination in the underwater environment; and
    an electronic ambient water color filter video light coupled to the first and second LED lights configured for adjusting projected LED light levels to capture video images of underwater marine life and features in realistic natural colors at depths of water used with a camera.

9. The underwater video light system of claim 8, wherein the power source includes a battery pack having a plurality of rechargeable batteries.

10. The underwater video light system of claim 8, further comprising at least one preset color set and light intensity setting for shallow water.

11. The underwater video light system of claim 8, further comprising at least one preset color set and light intensity setting for deeper water in a range from 14 to 22 meters deep.

12. The underwater video light system of claim 8, wherein the electronic ambient water color filter video light is configured to be used in oceans, seas, and lakes with varying water conditions.

13. The underwater video light system of claim 8, further comprising a wireless communication systems coupled to the electronic ambient water color filter video light configured to communicate from water depths to the surface above, satellites, and underwater and the electronic ambient water color filter video light is further configured to transmit information to a mobile device/phone app by means of Bluetooth™, Wi-Fi™, or any wired or wireless technology which can then synchronize the data.

14. The underwater video light system of claim 8, further comprising a user adjustable light intensity setting device coupled to the electronic ambient water color filter video light configured for adjusting the light intensity using the power source.

15. An underwater video light system, comprising:
- a first LED light configured to project a natural daylight in a white color temperature in an underwater environment;
- a second LED light coupled to the first LED having a plurality of various colored LEDS configured to mix and blend primary colors and project color tinting of natural colors in an underwater environment;
- a plurality of sensors coupled to the first and second LED lights configured to measure white balance including color temperatures of the underwater environment and location depth;
- a power source coupled to the first and second LED lights, wherein the power source is configured to adjust the light intensity based on the plurality of sensors measurement data related to the underwater environment and location depth;
- an automatic power intensity actuator to automatically adjust the light intensity illumination to changing camera depths and water color temperatures of the underwater environment;
- an adjustment device coupled to the power source configured to allow a user to adjust the power to the first and second LED lights to adjust the light intensity illumination in the underwater environment; and
- an electronic ambient water color filter video light coupled to the first and second LED lights configured for adjusting projected LED light levels to capture video images of underwater marine life and features in realistic natural colors at depths of water used with a camera.

16. The underwater video light system claim 15, wherein the power source includes a battery pack having a plurality of rechargeable batteries.

17. The underwater video light system claim 15, further comprising at least one preset color set for shallow water down to 14 meters deep.

18. The underwater video light system claim 15, further comprising at least one preset color set and light intensity setting for deeper water in a range from 14 to 22 meters deep.

19. The underwater video light system claim 15, wherein the electronic ambient water color filter video light is configured to be used in oceans, seas, and lakes with varying water colors.

20. The underwater video light system claim 15, further comprising a wireless communication systems coupled to the electronic ambient water color filter video light to communicate from water depths to the surface above, satellites, and underwater and the video light can also transmit information to a mobile device/phone app by means of Bluetooth™, Wi-Fi™, or any wired or wireless technology which can then synchronize the data.

* * * * *